(12) United States Patent
Dittrich (10) Patent No.: US 11,398,737 B2
(45) Date of Patent: Jul. 26, 2022

(54) CHARGING STATION FOR TELECOMMUNICATION OR SMALL ELECTRONIC DEVICES

(71) Applicant: Klemens Dittrich, Wuppertal (DE)

(72) Inventor: Klemens Dittrich, Wuppertal (DE)

( * ) Notice: Subject to any disclaimer, the term of this patent is extended or adjusted under 35 U.S.C. 154(b) by 290 days.

(21) Appl. No.: 16/636,362

(22) PCT Filed: Aug. 3, 2018

(86) PCT No.: PCT/DE2018/100685
§ 371 (c)(1),
(2) Date: Apr. 6, 2020

(87) PCT Pub. No.: WO2019/024962
PCT Pub. Date: Feb. 7, 2019

(65) Prior Publication Data
US 2020/0244083 A1    Jul. 30, 2020

(30) Foreign Application Priority Data

Aug. 4, 2017    (DE) ..................... 10 2017 117 730.2
Sep. 29, 2017   (DE) ..................... 10 2017 122 691.5

(51) Int. Cl.
*H01M 10/46* (2006.01)
*H02J 7/00* (2006.01)
*G04G 19/00* (2006.01)

(52) U.S. Cl.
CPC ............ *H02J 7/0044* (2013.01); *G04G 19/00* (2013.01); *H02J 7/0045* (2013.01)

(58) Field of Classification Search
CPC ...... H02J 7/0044; H02J 7/0042; H02J 7/0045; H02J 7/0013; G06F 1/1632
USPC .......................... 320/107, 111, 114, 115, 116
See application file for complete search history.

(56) References Cited

U.S. PATENT DOCUMENTS

| | | |
|---|---|---|
| 2011/0025263 A1 | 2/2011 | Gilbert |
| 2013/0113420 A1 | 5/2013 | Majoris, Jr. |
| 2013/0207478 A1* | 8/2013 | Metcalf .................. H01F 38/14 307/104 |

(Continued)

FOREIGN PATENT DOCUMENTS

| | | |
|---|---|---|
| DE | 202013008702 U1 | 12/2013 |
| DE | 202015103914 U1 | 9/2015 |

(Continued)

*Primary Examiner* — Edward Tso
(74) *Attorney, Agent, or Firm* — Cermak Nakajima & McGowan LLP; James Creighton Wray (57) ABSTRACT

The invention relates to a charging station (1) for telecommunication devices and other small electronic devices, which comprises a platform (3) having a plurality of webs (4-6) arranged parallel to each other. Supply cables and plug connections for connection to the associated charging device can be routed under said platform (3). An adapter (2) is used to connect the telecommunication devices or small devices positioned on the platform (3) to the supply cables or plug connections under the platform (3). The adapter (2) is to be positioned transversely to the webs (4-6) and has a receptacle (8) for a telecommunication device or small device and a fastening block (7), which is to be inserted between two webs (4, 5) of the platform (3) and is connected to the receptacle (8) by means of an extension arm (9).

17 Claims, 10 Drawing Sheets

(56) References Cited

U.S. PATENT DOCUMENTS

2016/0058206 A1* 3/2016 Schwalbach ........... A47B 13/12
                                                    361/752
2018/0219392 A1* 8/2018 Dittrich ................. H02J 7/00

FOREIGN PATENT DOCUMENTS

WO      2014198262 A1    12/2014
WO      2017008768 A1     1/2017

* cited by examiner

CHARGING STATION FOR TELECOMMUNICATION OR SMALL ELECTRONIC DEVICES

This application claims the benefit of German Application No. 10 2017 117 730.2 filed Aug. 4, 2017, German application 10 2017 122 691.5 filed Sep. 29, 2017, and PCT/DE2018/100685 filed Aug. 3, 2018, International Publication No. 2019/024962, which are hereby incorporated by reference in their entirety as if fully set forth herein.

The invention relates to a charging station for telecommunication devices and other small electronic devices, such as clocks, with a platform featuring a plurality of mutually parallel webs, wherein the power supply cable and plug connections for connecting to the associated charging device can be disposed beneath the platform, and wherein at least one adapter is used for connection of the telecommunications devices or small devices to the power supply cables or plug connections beneath the platform.

BACKGROUND OF THE INVENTION

Telecommunication devices such as mobile telephones or tablet computers, as well as small devices such as electronic clocks, are becoming increasingly popular, so that in many households or offices several of these appliances can be found. In this respect every user recognizes the problem that the devices are often misplaced or no suitable space can be found for charging the device batteries, often because a co-worker or other household member is already charging another device. This also applies in the event that the user is not at home or in the office, but rather is present at an unfamiliar location, such as in a hotel. Stations that accommodate a plurality of such portable device are known, for example from WO 2017/008768 or WO 2014/198262. Devices of this kind are limited in their versatility, however, since adapters are needed in order to establish the connection between the device being charged and the power supply.

SUMMARY OF THE INVENTION

The object of the present invention is to create a charging station for telecommunication devices and small electronic devices such as clocks, which is particularly suitable for accommodating a plurality of even different terminals and which is particularly suitable for their connection and disconnection and for a dependable connection to the power supply.

This object is attained according to the invention in that the adapter is positioned transverse to the webs and features a receptacle for a telecommunications device or small device or parts thereof, and for a fastening block to be inserted between two webs of the platform and connected to the receptacle via an extension arm.

Thus a plurality of telecommunication devices and small devices can be arranged in or on the platform which are all connected to a charging device, such as to a USB charger. The connection in this regard is represented by an adapter which is arranged transverse to the webs and that features a receptacle for a telecommunication device or a small device. A fastening block inserted between two neighboring webs is used for mounting of the adapter; this fastening block, in turn, is connected to the receptacle by means of an extension arm. Thus a particularly flexible adapter is created which is characterized by easy insertion and handling, easy mount and dismount, and which additionally features a high compatibility.

One preferred embodiment of the invention provides that the receptacle, the extension arm, and/or the fastening block are designed as separate components which are to be connected together, so that cables can be very easily installed and again disconnected between the receptacle and the block, or stated differently, between the upper and lower side of the platform. The receptacle and extension arm can be designed expediently as a single part and are then connected to the fastening block as a single assembly. The particular device can be used without any particular effort and independently of how many other devices are already installed.

In addition, these functions are simplified in that the extension arm and the fastening block are connected together by means of a snap-in connection. Preferably this snap-in connection is designed such that the fastening block is pushed from the side into or withdrawn from the extension arm, thus transverse to its longitudinal axis.

It has proven to be expedient to insert the telecommunication device or the small device, such as an electronic clock, at an incline into the platform and/or into the adapter in order to better operate these devices during the charging process, for example. In this connection it is then sufficient that the fastening block features an incline on its top side, which is then transferred to the extension arm and in particular to the receptacle.

The easy installation of this kind of adapter was already discussed. In order that the cable also "disappears" in a suitable fashion, it is recommended that the receptacle, the extension arm and/or the fastening block feature recesses for routing of a cable, and quite preferably such recesses are located on their insides.

One preferred application for the receptacle is as an attachment for a fitness bracelet. An electronic fitness bracelet of this kind is placed around a corresponding mounting unit and is then charged simultaneously, wherein pockets can be used for holding of the mounting unit. The receptacle herein features two pockets, divided by a longitudinal slot, for accommodating of the fitness bracelet.

An additional preferred embodiment of the invention provides that a covering is provided that corresponds to the receptacle, to the extension arm and/or to the fastening block; the covering forms more or less the upper termination of the adapter, wherein beneath the covering and/or on its underside there are longitudinal slots through which the power supply cable can be routed.

In this regard it is proposed that the covering be designed as connectable to the receptacle and/or to the extension arm by means of a snap-in connection, so that an especially compact and easily handled adapter is created.

An additional application provides that cameras as small devices can be connected to the adapter and/or to the charging station. In this regard the invention provides that the adapter, in particular the upper side of the covering, features snap-in means for connecting of the adapter to an articulation which is provided on the camera itself. The snap-in connection at the upper side of the covering thus ensures not only stability, but rather also a complete rotational and pivot movement of the small device in the form of a camera during the charging process.

If the fastening block is positioned underneath the receptacle, then a particularly large receptacle is obtained for a telecommunication device or for a small electronic device. Thus the fastening block assumes its position between the webs, but simultaneously the receptacle is quite obviously dimensioned such that it or the adapter is held between the webs. In this variant of the invention, an extension arm between the fastening block and receptacle can be omitted.

Stated differently, the length and/or width of the receptacle are dimensioned as larger than the interior spacing between two webs of the platform, so that the fastening block between the two webs disappears, but simultaneously the adapter is held in place due to its sufficiently large dimensioning and is secured against twisting due to the block.

Additional assurance against displacement of the adapter is obtained when the fastening block is connected to the base of the housing of the charging station by means of at least one fastening means. A screw connection is one means to achieve this. Stable connections are easily obtained here, due to the compactness of the fastening block.

An additional preferred embodiment of the invention provides that the spacing between two neighboring webs is dimensioned so as to accommodate two telecommunications devices or small devices arranged one behind the other. This proposal is in connection with a technology in which contactless charging of batteries is used. In this regard the charging station according to the invention offers a solution in which two mobile telephones can be placed one behind the other, for example, in one correspondingly dimensioned free space between two webs.

In order to accommodate ordinary devices in this regard in the free space between the webs, it is useful that the webs have an interior spacing of 18 mm.

An additional preferred embodiment of the invention provides that a magnetic connection is provided between the platform and the housing into which the platform is to be inserted. In this regard the platform is used to accommodate the telecommunication devices and small devices and to establish the connection to the charging devices beneath the platform, which simultaneously also forms the upper termination of the housing. In order that the connection between the housing and the platform is additionally stabilized, the invention provides that a magnetic connection is provided between the platform and the housing into which the platform is to be inserted.

In a concrete case, the situation is such that the housing features on its inside a collar to support the platform, and that at least one magnet is supplied between the collar and the upper side of the housing. Thus firstly, the platform fits flush against the upper edge of the housing and secondly, additional support is provided due to the magnetic strips.

It is particularly expedient that the outsides of the outermost longitudinal webs of the platform each feature at least one magnet. Thus when installing the platform into the housing, the magnet connection will be established more or less by itself.

The invention is characterized in particular in that a charging station and an adapter for a charging station is obtained for telecommunication devices and small electronic devices, which is distinguished by a high functionality, easy assembly and disassembly and simple and reliable handling. In this regard an adapter is provided which consists of a receptacle, a fastening block and an extension arm as a kind of cantilever for connecting of receptacle and fastening block; this adapter is to be positioned transverse to the webs and is distinguished by a high compatibility in that in particular the receptacle is adapted to the particular telecommunication device or small electronic device. Cables for connecting of the upper side and lower side of the platform and/or of the device to the charging station are located and integrated in an efficient manner in the region of the receptacle, extension arm and/or fastening block such that they will not be externally visible.

Additional details and advantages of the subject matter of the invention are evident from the following description of the associated drawings, which depict preferred exemplary embodiments with their relevant details and individual parts. The figures show:

BRIEF DESCRIPTION OF THE DRAWINGS

FIG. 1 a charging station in an exploded representation,
FIG. 2 a charging station as seen from above,
FIG. 3 a charging station with installed telecommunication devices,
FIG. 4 compensating elements,
FIG. 5 a housing of a charging station with bridge,
FIG. 6 a bridge,
FIG. 7 an adapter in side view,
FIG. 8 an adapter in perspective view,
FIG. 9 an adapter in an exploded representation,
FIG. 10 a different adapter, side view,
FIG. 11 this adapter seen from above,
FIG. 12 this adapter in an exploded representation,
FIG. 13 an additional variant of an adapter, side view,
FIG. 14 this adapter in perspective view,
FIG. 15 this adapter in an exploded representation,
FIG. 16 an additional variant of an adapter seen from above,
FIG. 17 this adapter in an exploded representation,
FIG. 18 a covering,
FIG. 19 an adapter without covering,
FIG. 20 an adapter for a fitness bracelet,
FIG. 21 an additional variant of an adapter,
FIG. 22 a modification of FIG. 21,
FIG. 23 a supplemental representation for FIG. 1 and
FIG. 24 a variant to FIG. 20.

DETAILED DESCRIPTION

Figure 1:
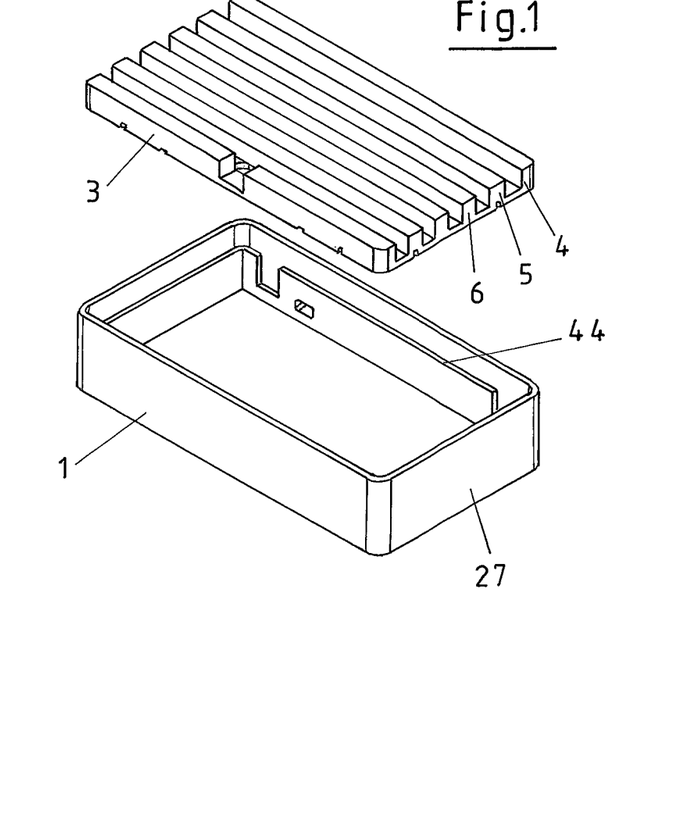

FIG. 1 depicts a charging station 1 which is composed of a housing 27 and a platform 3. The housing 27 features a perimeter collar 44 which allows the insertion of the platform 2 into the housing 27. The platform 3 comprises a plurality of longitudinal webs, of which three are depicted as examples bearing reference numbers 4, 5 and 6.

Figure 2:
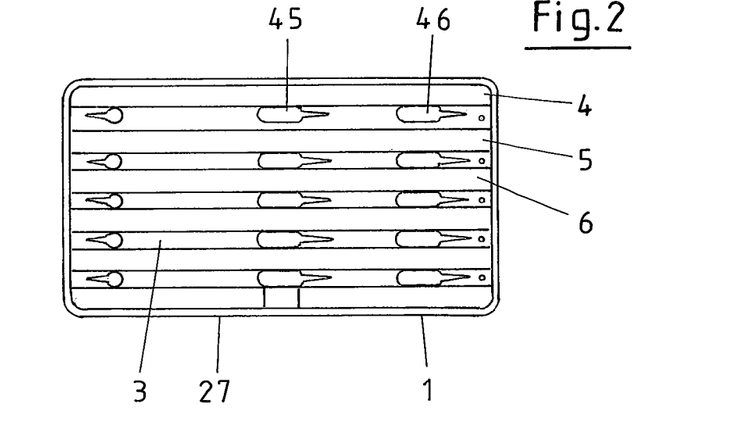

From above, FIG. 2 depicts a charging station 1 with passages 45, 46 etc. for the cables. The spacing between the longitudinal webs 4 and 5 is larger than the spacing between the other webs, in order to accommodate a plurality of telecommunication or small devices one behind the other, while jointly using the related connection.

Figure 3:
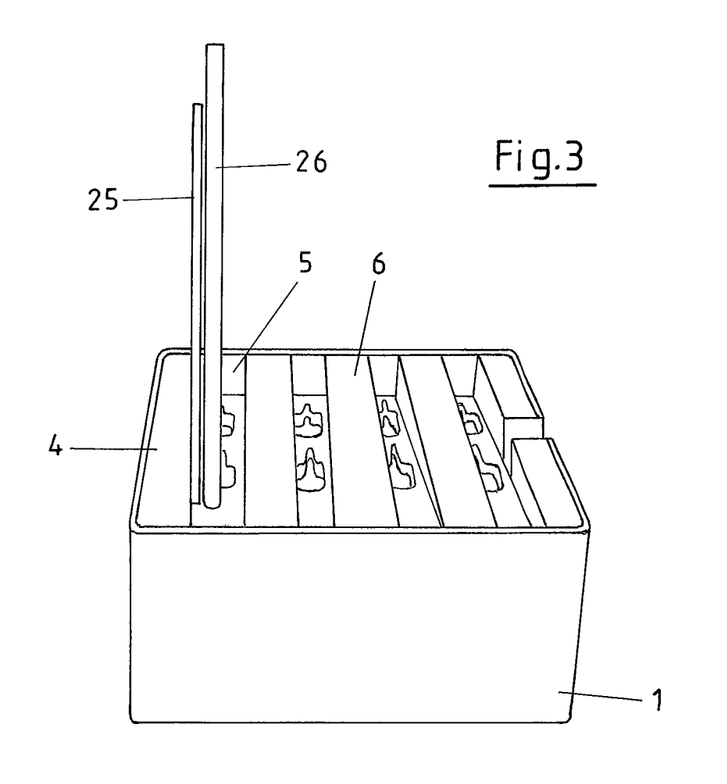

This is illustrated in FIG. 3 with the two installed telecommunication devices 25, 26 in the form of mobile telephones installed in the free space between the two longitudinal webs 4 and 5. The two telecommunication devices 25 and 26 more or less share the connection to the charging station.

Figure 4:
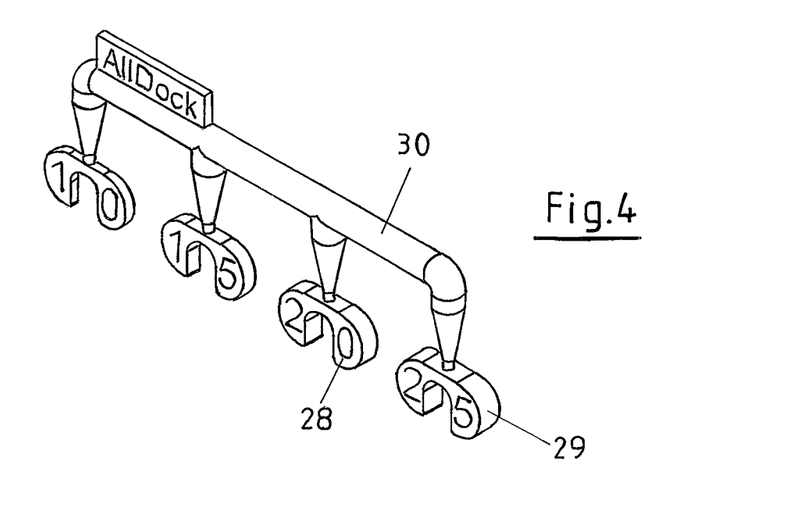

FIG. 4 depicts compensating elements 28, 29 etc. on one arm 30 of the installation. A compensating element of this kind is used for bridging of a plug connector. It frequently happens that such plug connectors do not take on the ideal seating, but rather slip out slightly, especially inward, so that then this kind of compensating element 28, 29 is used.

Figure 5:
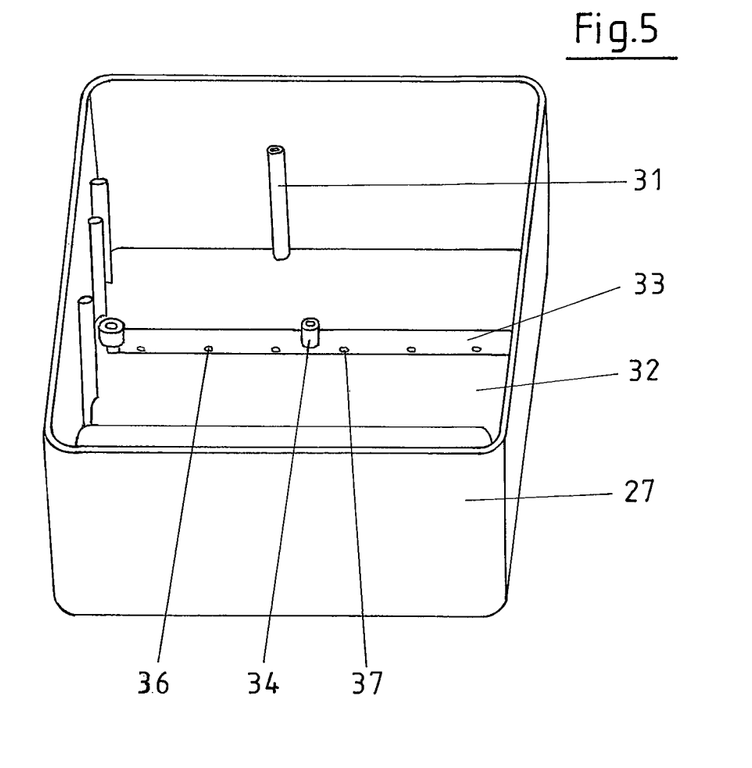

FIG. 5 depicts a housing 27 with two additional installations. It is depicted by the small tube 31 with a receptacle for a fastening means (not depicted here) for assembly of the charging station formed from the platform and housing 27. The other focus of interest is the bridge 33 on the bottom 32 of the housing 27. The bridge 33 features several perforations, of which two examples are shown and identified by reference numbers 36 and 37. They are provided for routing and/or for fastening of the cables and thus also serve to ensure a certain sorting of the cables in the interior of the housing 27. Receptacles 34, 35 serve here for fastening means (not depicted here).

Figure 6:
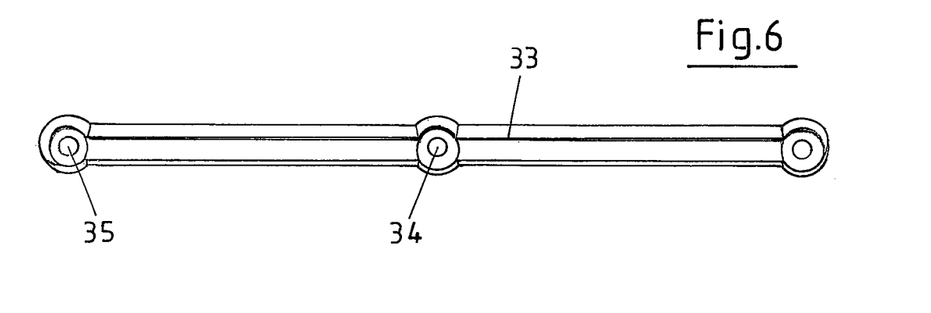

This kind of bridge 33 is depicted in a top view in FIG. 6, with the exemplary receptacles 34 and 35 for the fastening means (not depicted here).

Figures 7, 8:
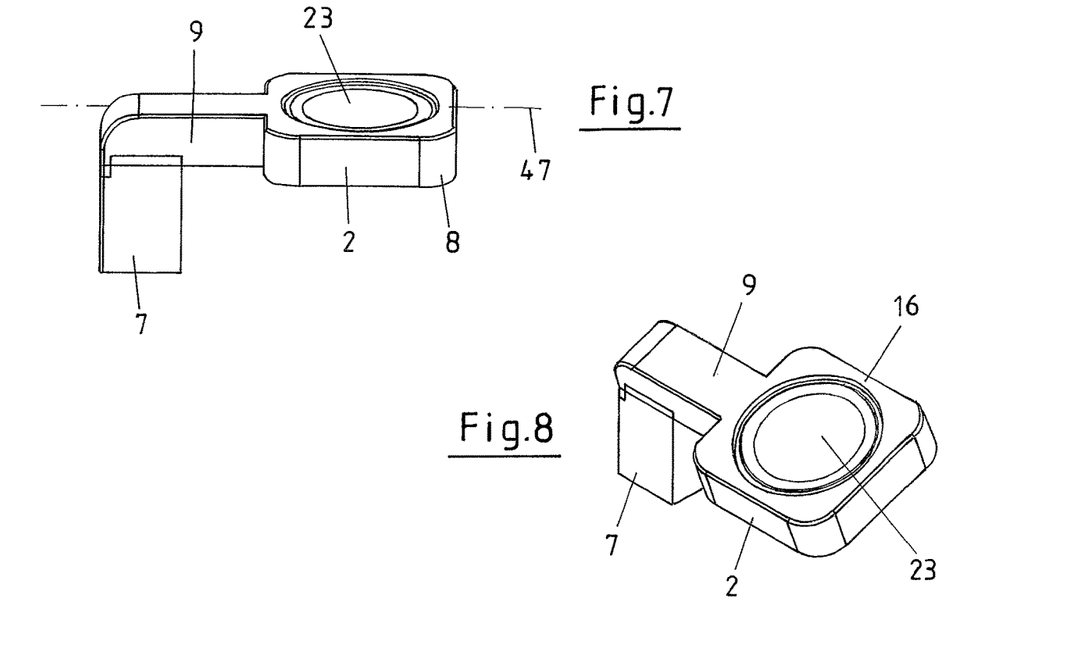

FIG. 7 depicts an adapter with the essential components of receptacle 8—here, for an electronic clock 23—a fastening block 7 and extension arm 9, so that this adapter 2 can be inserted with its longitudinal axis 47 transverse to the webs of the platform and secured.

This is depicted more clearly in FIG. 8, with an inclined assembly composed of receptacle 8 and extension arm 9.

Figure 9:
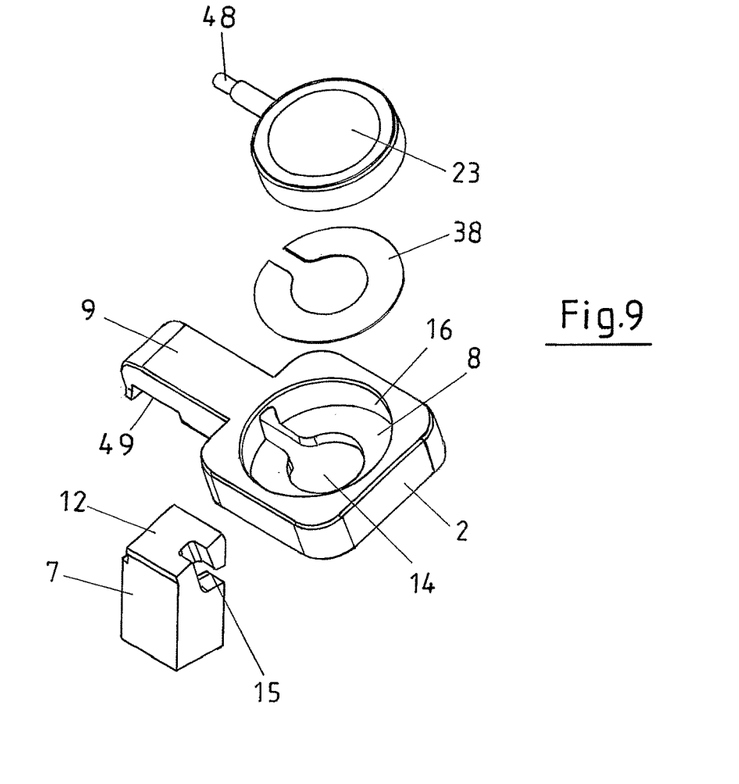

Next, FIG. 9 represents an exploded representation of one such adapter 2. It is evident that the block 7 features an incline on its upper side 12, which the block 7 then more or less imparts to the extension arm, and specifically to the receptacle 8. Reference number 15 denotes a recess for a cable on the side of the block. FIG. 9 depicts the component consisting of the receptacle 8 and extension arm 9. The recesses 14 for the cables are readily evident in the head plate 16 and/or in the recess 8. Reference number 38 denotes a compensating ring, and reference number 23 denotes the electronic clock with its connection 48. Based on FIG. 9 it is also readily apparent how the snap-in connection can be established between the fastening block 7 and the extension arm 9, in that both components correspond to each other on their top side 12 and/or on their bottom side 49, respectively.

Figure 10:
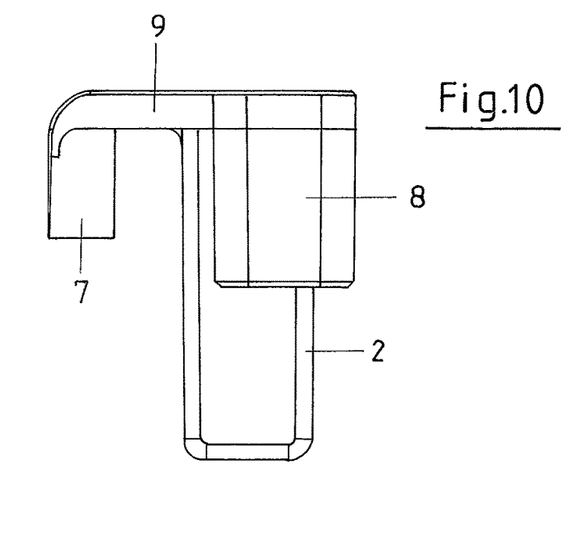

FIG. 10 depicts one variant of an adapter 2 which again consists essentially of the components of fastening block 7, extension arm 9, and receptacle 8, in order for example, to place Bluetooth earphones into the receptacle 8 for charging.

Figure 11:
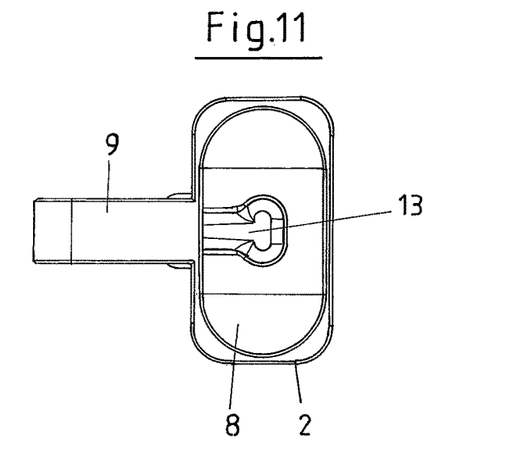

This is evident in FIG. 11 with the recess 13 in the receptacle 8 for accommodating of power supply cables.

Figure 12:
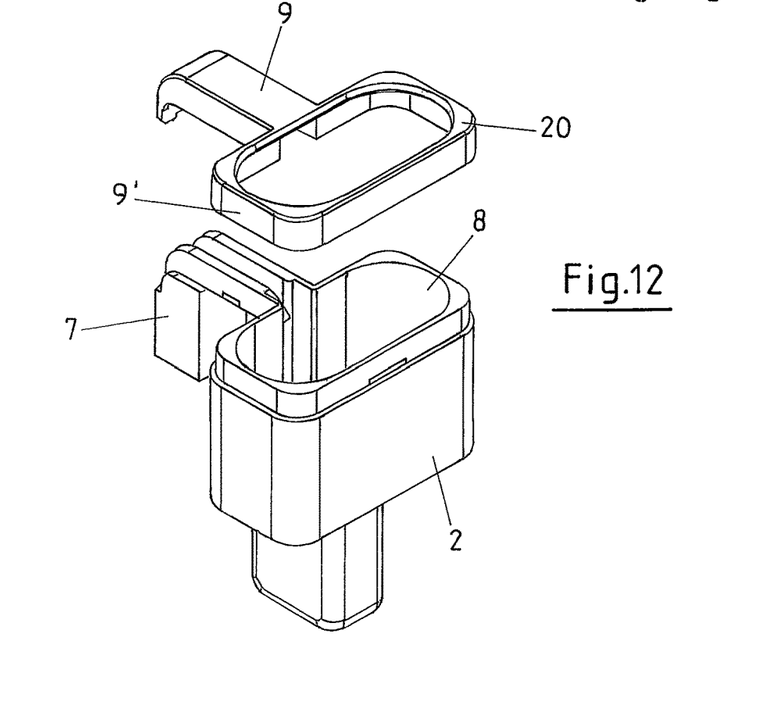

In this regard FIG. 12 illustrates that a kind of covering 20 is set onto the adapter 2 in the region of the receptacle 8, the two parts 9, 9' of the extension arm correspond to each other.

Figure 13:
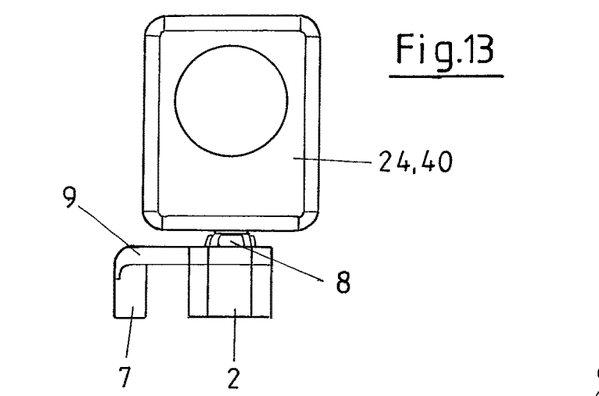
Figure 14:
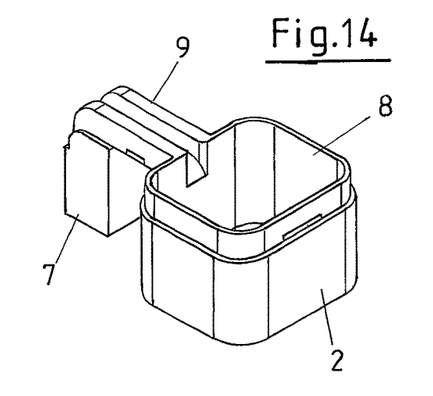
Figure 15:
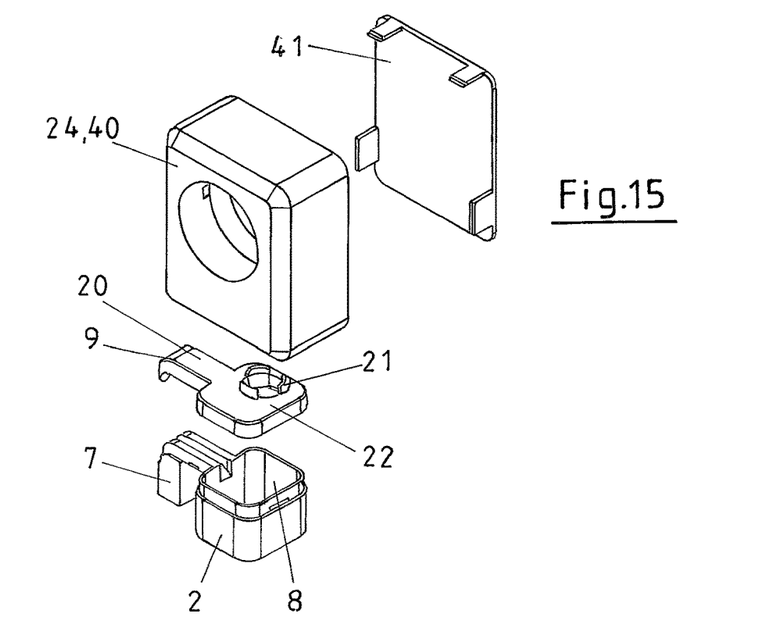

The depictions according to FIGS. 13 to 15 pertain to an application in connection with a camera. Firstly, FIG. 13 depicts one such camera 40 as an example for a small device 24, connected to the receptacle 8 and thus connected to the adapter 2 in the form of an articulation as indicated in FIG. 13.

Next, FIG. 14 depicts an adapter 2—here, without a covering—which will be discussed in greater detail with respect to FIG. 15.

This FIG. 15 depicts the covering 20 for the adapter 2. On its upper side 22 this covering 20 features snap-in means with which the adapter 2 and the small device 24 in the form of a camera can be connected together in a rotational and pivoting manner. Simultaneously, the adapter 2 of course bridges the distance between camera and charging station. Reference number 41 denotes an additional covering for the housing of the camera 40.

Figure 16:
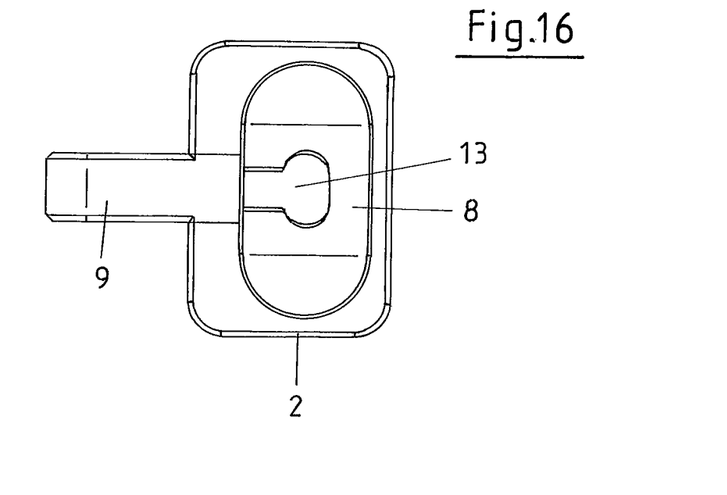
Figure 17:
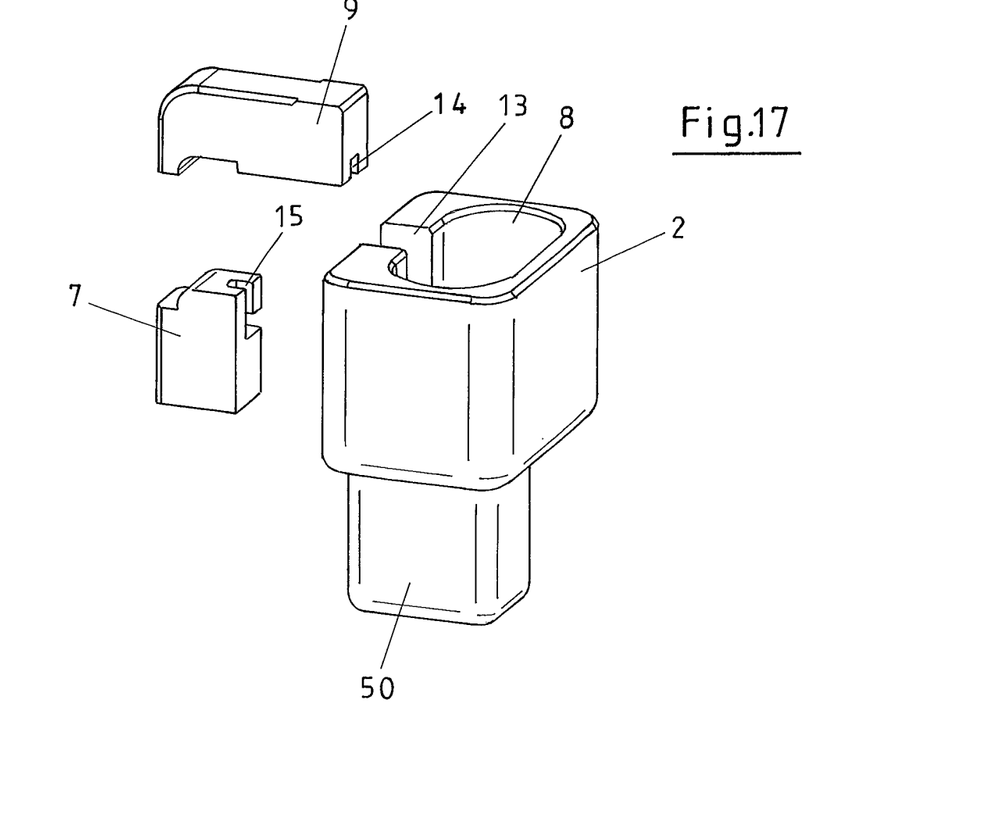

FIG. 16 and FIG. 17 then depict an additional variant. The receptacle 8 is visible from above in FIG. 16, with the recess 13 for guiding of the cable in the direction of and/or beneath the extension arm 9.

FIG. 17 illustrates an adapter 2 in which the length and width of the receptacle 8 are of greater dimension that the inside spacing between two webs, which is expressed by the smaller dimensioning of the block 50 in relation to the receptacle 8.

Figures 18, 19:
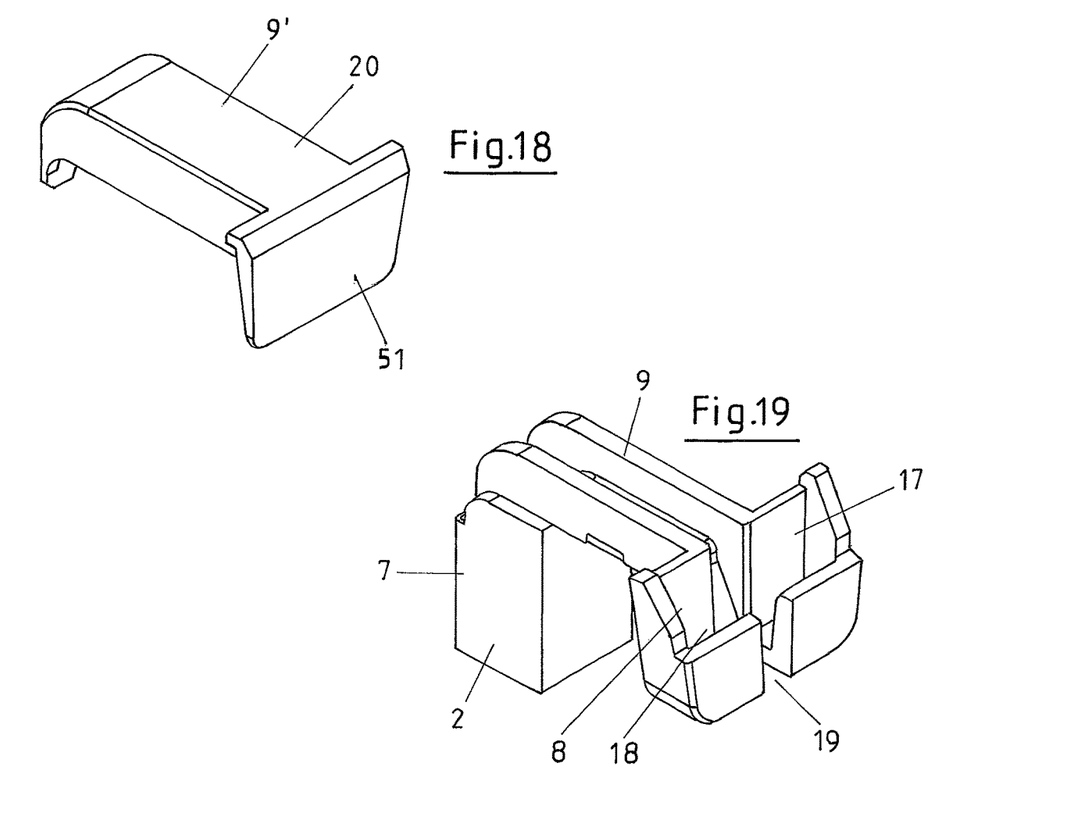

FIG. 18 depicts a covering 20 with the extension arm 9' and a fastening plate 51.

FIG. 19 then depicts an adapter 2 with fastening block 7, receptacle 8 and extension arm 9, onto which the covering depicted in FIG. 18 can be set. Two pockets 17, 18 are used as receptacle 8 here, which are separated from each other by a longitudinal slot 19 and their function is explained in greater detail in FIG. 20.

Figure 20:
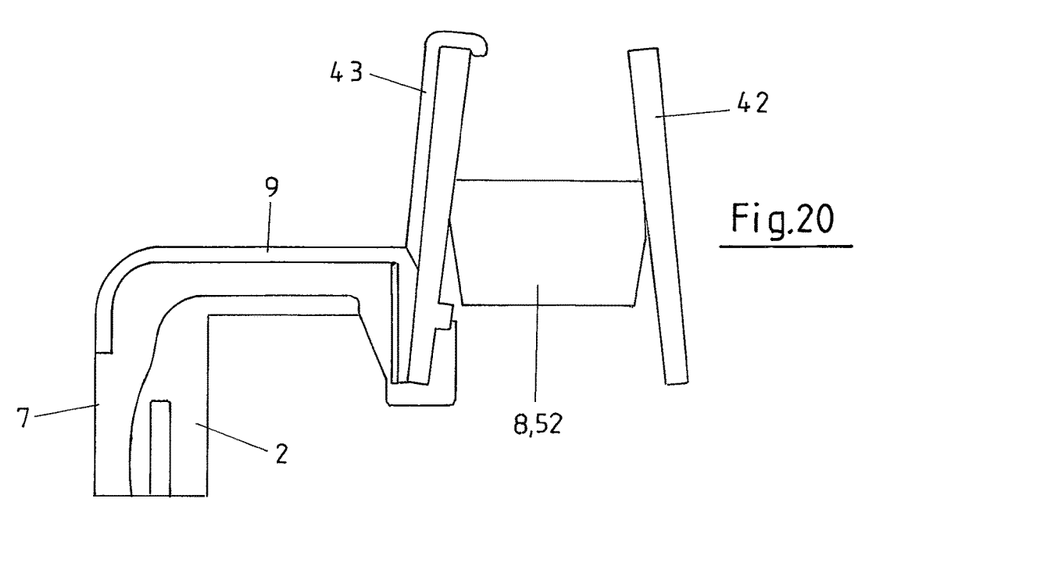

For example, FIG. 20 depicts an adapter 2 with two arms 42, 43 and a middle piece 52 as receptacle 8 for a fitness bracelet (not illustrated here), which then rests upon the middle piece 52 during the accommodation and/or charging.

Figures 21, 22:
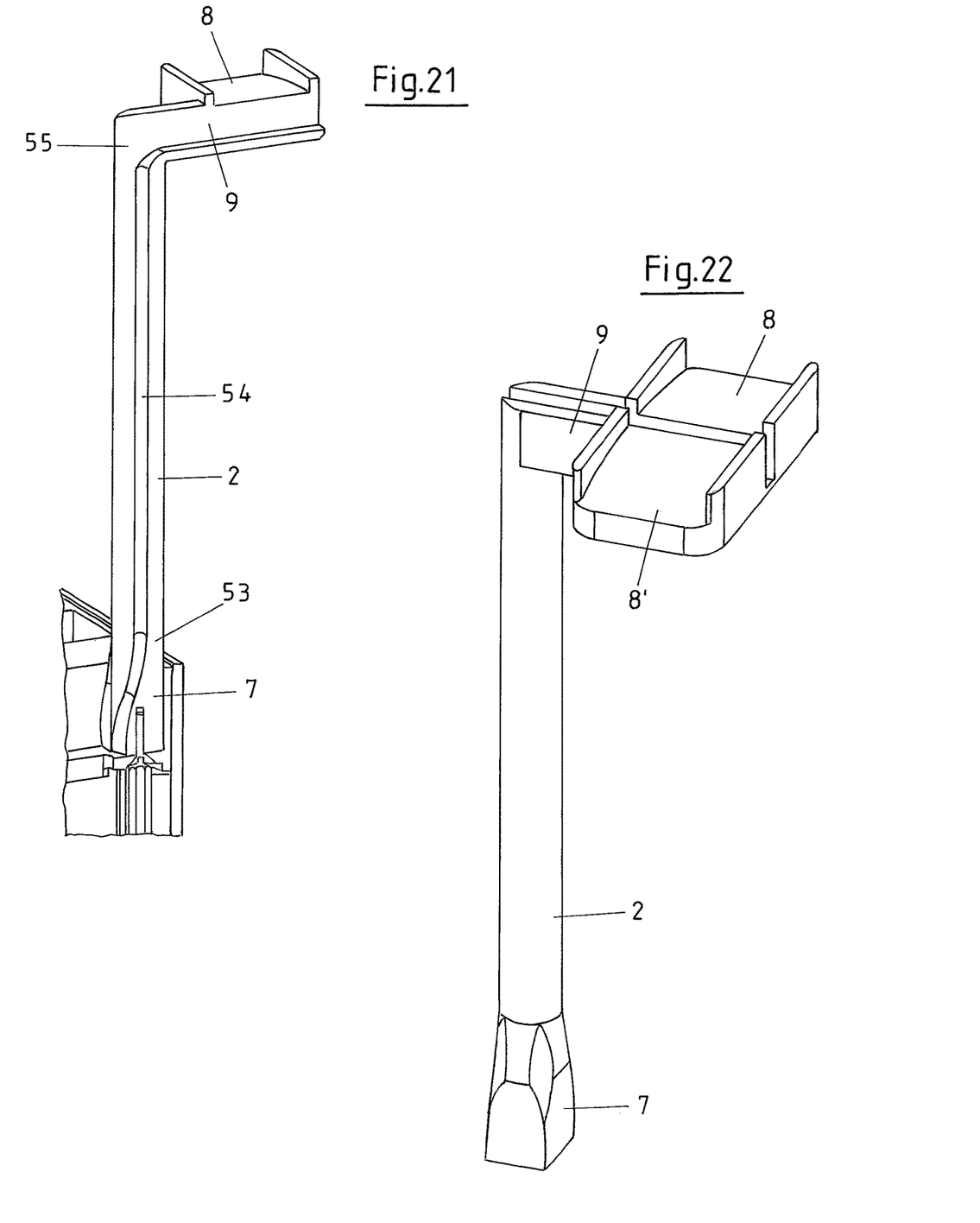

The variant of the invention according to FIG. 21 can be used for accommodation of earphones. An adapter 2 of this kind comprises a fastening block 7 on its underside 53. Reference number 54 denotes the cable; the adapter 2 with the receptacle 8 adjoins at the top side 55. In this respect FIG. 22 depicts another variant with a broader receptacle 8, 8'.

Figure 23:
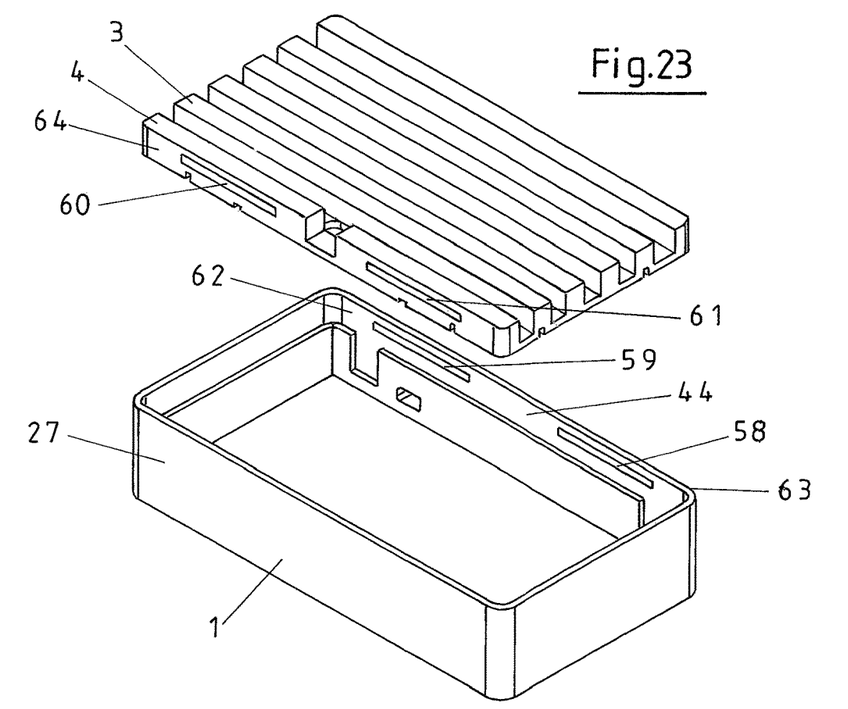

FIG. 23 depicts a charging station 1 with housing 27 and the platform 3 installed in this housing 27. The housing 27 comprises a perimeter collar 44 whose positioning is tailored such that the platform 3 with the webs 4 etc. fit flush against the upper edge 63 of the housing 27. Two magnet strips 58, 59 are located at the inside 62 of the housing 27 between the collar 44 and the upper edge 63 of the housing. The magnet strips 58, 59 on opposing insides of the housing 27 correspond to magnet strips 60, 61 on opposing outsides 20 of the platform 3, or stated more precisely, correspond to the magnet strips 60, 61 at the outside 64 of the outer longitudinal web 4 of the platform 3 (after a rotation of the platform 3 by 180°). Positioning of magnet strips at opposing flanks of the housing 27 and platform 3 has proven to be particularly advantageous in this regard.

Figure 24:
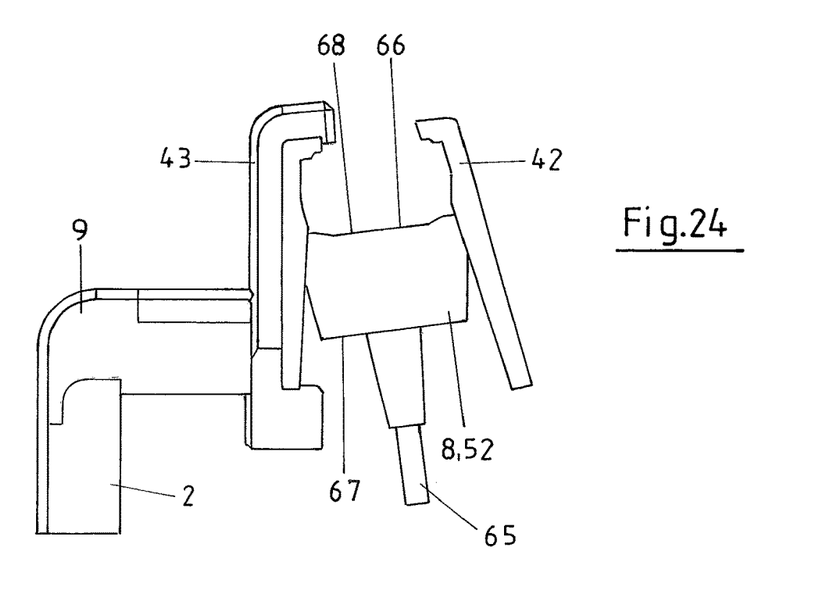

Finally, FIG. 24 depicts an adapter 2 for accommodating of a bracelet, in particular a fitness bracelet with indicators for health and fitness, and also for recording of activities, rest pauses etc. or of an earphone, etc. Thus the adapter 2 comprises, in addition to the boom 9, two wing-like arms 42 and 43, which are positioned opposite each other and act jointly to accommodate the device (not illustrated here). Reference number 52 and/or 8 depicts the middle piece and/or the receptacle, which in turn features a connection 65 to the underside 67 of the receptacle. In this case we are dealing with the connection to the charging device, whereas the connections with reference number 66 are provided at the top side 68 of the receptacle 8. These are used to establish the connection to the device. Hence the effectiveness of the receptacle and also the securing of the device via the arms 42, 43 and the receptacle 8 is well evident in FIG. 24.

The invention claimed is:

1. Charging station (1) for telecommunication devices and other small electronic devices, with a platform (3) featuring a plurality of mutually parallel webs (4-6), wherein the power supply cable and plug connections for connecting to the associated charging device can be disposed beneath the platform, and wherein at last one adapter (2) is used for connection of the telecommunications devices or small devices to the power supply cables or plug connections beneath the platform (3), wherein the adapter (3) is positioned transverse to the webs (4-6) and features a receptacle (8) for a telecommunications device or small device, and for a fastening block (7) to be inserted between two webs (4, 5) of the platform (3) and connected to the receptacle (8) via an extension arm (9).

2. Charging station according to claim 1, wherein the receptacle (8), extension arm (9) and/or fastening block (7) are designed as separate components to be connected together.

3. Charging station according to claim 1, wherein the extension arm (9) and the fastening block (7) are connected to each other by means of a snap-in connection.

4. Charging station according to claim 1, wherein the fastening block (7) features an incline on its top side (12).

5. Charging station according to claim 1, wherein the receptacle (8), the extension arm (9) and/or the fastening block (7) feature recesses (13-15) for the routing of a cable.

6. Charging station according to claim 1, wherein the receptacle (8) is designed as a fastening for a fitness bracelet.

7. Charging station according to claim 1, wherein a covering (20) is provided that corresponds to the receptacle (8), to the extension arm (9) or to the fastening block (7).

8. Charging station according to claim 7, wherein the covering (20) is designed so as to be connected to the receptacle (8) or to the extension arm (9) by means of a snap-in connection.

9. Charging station according to claim 7, wherein the adapter (2), in particular the covering (20) features on its top side (22) snap-in means (21) for connecting of the adapter (2) to an articulation.

10. Charging station according to claim 1, wherein the fastening block (7) is positioned beneath the receptacle (8).

11. Charging station according to claim 10, wherein a length or width of the receptacle (8) is of greater dimension that the interior spacing between two webs (4, 5) of the platform (3).

12. Charging station according to claim 1, wherein the fastening block (7) is connected to the housing base (32) of the charging station (1) by means of at least one fastening means.

13. Charging station according to claim 1, wherein the spacing between two neighboring webs (4, 5) is dimensioned so as to accommodate two telecommunications devices or small electronic devices arranged one behind the other.

14. Charging station according to claim 13, wherein the webs (4, 5) feature an interior spacing of 18 mm.

15. Charging station according to claim 1, wherein a magnetic connection (58-61) is provided between the platform (3) and the housing (27) into which the platform (3) is to be inserted.

16. Charging station according to claim 15, wherein the housing (27) features on its inside (62) a collar (44) to support the platform (3) and that at least one magnet (58, 59) is provided between the collar (44) and the top edge (63) of the housing (27).

17. Charging station according to claim 15, wherein the platform (3) features at least one magnet (60, 61) on the outside (64) of each of its outer longitudinal webs (4).

\* \* \* \* \*